United States Patent [19]

Vanderjagt

[11] Patent Number: 4,685,592

[45] Date of Patent: Aug. 11, 1987

[54] PUMPING SYSTEM WITH CONTROL VALVE

[76] Inventor: John A. Vanderjagt, 1395 Glen Oaks Dr., Memphis, Tenn. 38117

[21] Appl. No.: 803,013

[22] Filed: Nov. 29, 1985

[51] Int. Cl.$^4$ .......................... B67D 5/06; F04B 49/02
[52] U.S. Cl. ..................................... 222/148; 222/318; 222/383; 137/523; 137/541; 239/112; 239/127; 417/305
[58] Field of Search ........................ 222/148, 318, 383; 417/311, 446, 305; 137/569, 523, 541, 522; 134/168 R; 239/112, 126, 127

[56] References Cited

U.S. PATENT DOCUMENTS

| | | | |
|---|---|---|---|
| 1,172,959 | 2/1916 | Dormon | 137/523 X |
| 2,288,954 | 7/1942 | Reid | 137/523 X |
| 2,393,406 | 1/1946 | Parsons | 222/318 |
| 2,434,771 | 1/1948 | Mueller et al. | 222/318 |
| 3,153,495 | 10/1965 | Williams et al. | 222/318 |
| 3,227,326 | 1/1966 | Beamer | 222/328 |
| 4,108,336 | 8/1978 | Anderson | 134/168 R X |
| 4,177,937 | 12/1979 | Stevens et al. | 222/318 X |
| 4,246,924 | 1/1981 | Droitsch et al. | 417/311 X |
| 4,386,637 | 6/1983 | Buchanan et al. | 134/168 R X |

Primary Examiner—Joseph J. Rolla
Assistant Examiner—Frederick R. Handren
Attorney, Agent, or Firm—Walker & McKenzie

[57] ABSTRACT

A pumping system for containing and dispensing liquids, such as poisonous or hazardous chemicals and the like. The system has a spring-biased, manually-openable by pass valve incorporated therein which is selectively positionable in various positions without the user coming in contact with the poisonous or hazardous chemicals and the like.

10 Claims, 14 Drawing Figures

PUMPING SYSTEM WITH CONTROL VALVE

BACKGROUND OF THE INVENTION

1. Field of the Invention:

The present invention relates to a pumping system for liquid chemicals and the like.

2. Description of the Prior Art

In order to conform to various environmental protection laws concerning poisonous or hazardous liquid chemicals and the like, the drums and equipment used in dispensing such chemicals has to be periodically rinsed and cleaned. Heretofore, with previous systems there was a risk of the user coming in contact with such chemicals since the systems had to be opened for rinsing, cleaning and the like.

SUMMARY OF THE INVENTION

The present invention is directed toward providing a pumping system with a unique valve incorporated therein which makes it possible to conform to various environmental protection laws without the user of the system running the risk of coming in contact with poisonous or hazardous chemicals and the like.

One of the objects of the present invention is to provide an improved pumping system in which a valve is interposed in the system that is selectively positionable in various positions without the user coming in contact with the poisonous or hazardous chemicals and the like so that the system may be rinsed and cleaned and various other operations performed without risk to the user.

The improved pumping system of the present invention comprises, in general, a valve interposed in said system and which valve includes a hollow sleeve member, a valve member movably mounted in the sleeve member and being selectively placeable in a free condition in which said valve member is relatively unrestrained between upper closed and lower opened positions of said valve and placeable in restrained conditions of said valve; spring means urging said valve member toward said upper closed position, and control means coupled to said valve member for holding said valve member selectively in said restrained conditions to control the liquid chemicals and the like passing through said hollow body member and to control the fluid pressure in said system.

DESCRIPTION OF THE PREFERRED EMBODIMENT

The improved pumping system 11 of the present invention includes, in general, a container 13 having an interior 15 for holding the liquid chemicals L or the like, a positive displacement pump 17 including pump driving means 19 with pump 17 including an outlet chamber 21, intake pipe means 23 extending into the interior 15 and being open at the lower end thereof, not shown, providing a conduit for liquid chemicals and the like to be pumped by pump 17 from the interior 15 of the container 13 to outlet chamber 21; and dispensing means 25 including a hose 27 having one end 29 thereof communicating with outlet chamber 21 and nozzle means 31 at the other end 33 of hose 27.

While it is contemplated that the valve 35 of the present invention may be incorporated in other pumping systems for pumping liquid chemicals and the like which include a container and positive displacement pump means for pumping the liquid, the valve 35 is disclosed herein combined in a pumping apparatus or system similar to that disclosed in my application, U.S. Ser. No. 06/646,916 entitled "Pumping Apparatus" filed Sept. 4, 1984, now U.S. Pat. No. 4,557,669, which is incorporated herein by reference and to which reference may be had for the details of such a pumping apparatus or system with which the valve 35 of the present invention may be embodied in combination therewith.

Thus, pump 17 preferably includes a pump body 37 having an inlet chamber 39 therein with which the upper end of inlet pipe means 23 communicates. The positive displacement pump 17 may be of any type well known to those skilled in the art for pumping the liquid L from the inlet chamber 39 to the outlet chamber 21. As previously stated, the pump 17 is illustrated in the drawings of that type shown in my said application, U.S. Ser. No. 06/646,916 and which includes suitable piston means 40 and diaphragm means, not shown, as well as outlet valve means 41 for allowing the liquid to flow from the pump chambers 43 (only one of which is shown) to outlet chamber 21.

In addition, the pump driving means 19 includes a motor 45 of any suitable construction driven by a suitable power source, not shown, well known to those skilled in the art with electricity being fed to the motor 45 as through the electric cord 47. A suitable switch, not shown, well known to those skilled in the art is preferably provided for turning motor 45 off and on.

Motor 45 includes a rotatable shaft 49 on which is mounted a wobble or swash plate 51, the details of which may be had by reference to my said application, U.S. Ser. No. 06/646,916. Suitable coupling means 53 is provided for detachably coupling pump driving means 19 to the other part of the pump 17, preferably in the manner disclosed in my said patent application, U.S. Ser. No. 06/646,916 so that swash plate 51 drives the piston means 40, not shown, of the diaphragm pump to pump the liquid chemical or the like through the path heretofore described and as described in my said application, U.S. Ser. No. 06/646,916.

The pump 17 extends down through an opening 55 in container 13 and is mounted therein by a flange 57 attached to the outside of the pump 17 and extending outwardly therefrom where it sealingly engages the container 13 and is fixed thereto as by means of the bolts 59. Thus, the system is a clsoed one with ingress and egress into and out of the interior 15 of container 13 being preferably only through the hose 27. It will be noted that the proximal end 29 of hose 27 opposite from the distal end 33 is connected to outlet chamber 21 by any suitable means well known to those skilled in the art and is illustrated in the drawings as being connected in the same manner as the connection in my said application, U.S. Ser. No. 06/646,916, that is, with a coupling means 61 having a reduced lower part 63 which fits into a socket 64 in the manner shown in my said application, U.S. Ser. No. 06/646,916. In addition, a meter 149, well known to those skilled in the art, is preferably provided between end 29 and coupling means 61.

The improvement of the present invention includes the valve 35 to be hereinafter described which is interposed in the pump 17 between outlet chamber 21 and the interior 15 of container 13 to perform various functions that will be better understood in the description to follow. In addition, it will be understood that with the valve 35, it will not be necessary to have the bypass valve 267 shown in my said application, U.S. Ser. No. 06/646,916 since the valve 35 performs the bypass function in addition to other functions as will be hereinafter described.

Valve 35 includes a hollow sleeve member 66 which is preferably cylindrical and preferably formed integrally with pump body 37 (see FIG. 3) with the lower end 67 thereof extending below the pump body 37 and opening into interior 15 of the container 13 and with the upper end 68 thereof communicated with outlet chamber 21. Also, valve 35 in general includes a valve member 71, spring means 73, and control means 75.

Valve member 71 is generally cylindrical and is provided with a hollow interior 77 which opens upwardly through an opening 79 in the upper end 81 of valve member 71. Valve member 71 is provided with a plurality of vertically elongated apertures, preferably four in number, i.e., 83a, 83b, 83c and 83d in the side wall 85 of valve member 71. Apertures 83a, 83b, 83c and 83d are preferably spaced apart at 90° intervals and each are preferably rounded at the top and bottom thereof. The width of the apertures 83a, 83b, 83c and 83d are such that they extend through a major portion of side wall 85 leaving a plurality of thin leg-like vertical portions 85a, 85b, 85c and 85d of side wall 85. A bottom 87 of valve member 71 is integrally attached to the lower ends of side wall portions 85a, 85b, 85c and 85d to block the flow of fluid through the lower end of valve member 71. Extending circumferentially around the exterior of bottom 87 is a groove 89 having an O-ring 91 mounted therein adapted to sealingly engage the cylindrical inner wall 93 of hollow sleeve member 66. The outside diameter of valve member 71 is sized so that the valve member 71 is freely movable vertically in hollow sleeve member 66 with the upper end 81 slidably contacting the inner wall 93 and the O-ring 91 slidably and sealingly engaging the inner wall 93 as above described.

Spring means 73 preferably comprises a compression spring which is disposed in the interior 77 of valve member 71. Spring means 73 is retained at the upper end 95 thereof in valve member 71 by an upper pin 97 that extends across the upper end 81 of valve member 71 with the opposite ends of the upper pin 97 extending into apertures 99 through opposite portions of upper end 81. A lower pin 101 extends through opposing pairs of apertures 83a, 83c and below the lower end 103 of spring means 73 with the opposite ends of lower pin 101 extending through opposing apertures 105 provided in the lower end 67 of hollow sleeve member 66. Thus, spring means 73 urges valve member 71 towards an upper closed position shown in FIG. 3, wherein it will be seen fluid flow from outlet chamber 21 into valve member 71 through opening 79 and apertures 83a, 83b, 83c and 83d, and is blocked off by the O-ring 91 engaging the inner wall 93 of hollow sleeve member 66.

Deflecting means which includes a dish-shaped body 107 is coupled to the bottom 87 of valve member 71 for deflecting the liquid chemicals or the like as will be better understood in the description to follow. Body 107 includes a circular center portion 109 and an annular portion 111 preferably integrally attached to the outer circumference of circular center portion 109 and extending upwardly and outwardly therefrom. Annular portion 111 is provided with an annular face 113 angled upwardly and outwardly. Body 107 is fixedly attached to the bottom 87 of valve member 71 by suitable means, as a bolt 115 extending upwardly through a central aperture 117 in body 107 and threadedly engaged in a threaded socket 119 in the central portion of bottom 87. A circular projection 120 depending centrally from bottom 87 extends into an enlarged upper portion 117' of aperture 117.

Control means 75 includes a rod 121 movably extending through an aperture 123 in flange 57 and through an aperture 125 in the top 127 of container 13. Rod 121 is rotatable about its longitudinal axis as well as being movable up and down along its longitudinal axis. There are suitable sealing means 129 well known to those skilled in the art forming a seal between the rod 121 and the portions of flange 57 defining aperture 123 and the portions of top 127 defining aperture 125 so that there is no leakage therethrough. Rod 121 has a lower end 131 and an upper end 133. Rod 121 extends above flange 57 so that the upper end 131 of rod 121 is on the exterior of container 13. Also, the rod 121 extends downwardly through aperture 125 into the interior 15 of container 13 so that the lower end 131 of rod 121 is disposed in interior 15. Lower end 131 is fixedly attached to body 107 by suitable means well known to those skilled in the art. A preferable way of such an attachment is by providing a bolt 137 extending upwardly through an aperture 139 in annular portion 111 and then into a threaded socket, not shown, in the lower end 131 of rod 121. Control means 75 includes a handle 141 integrally attached to the upper end 133 of rod 121 and extending outwardly therefrom.

A suitable latching means is provided which preferably includes a projection 143 which projects outwardly beyond the side of pump body 37 adjacent handle 141 so that handle 141 can be moved downwardly and turned to engage beneath projection 143 for selectively holding control means 75 downwardly.

Figures 3, 4, 5:
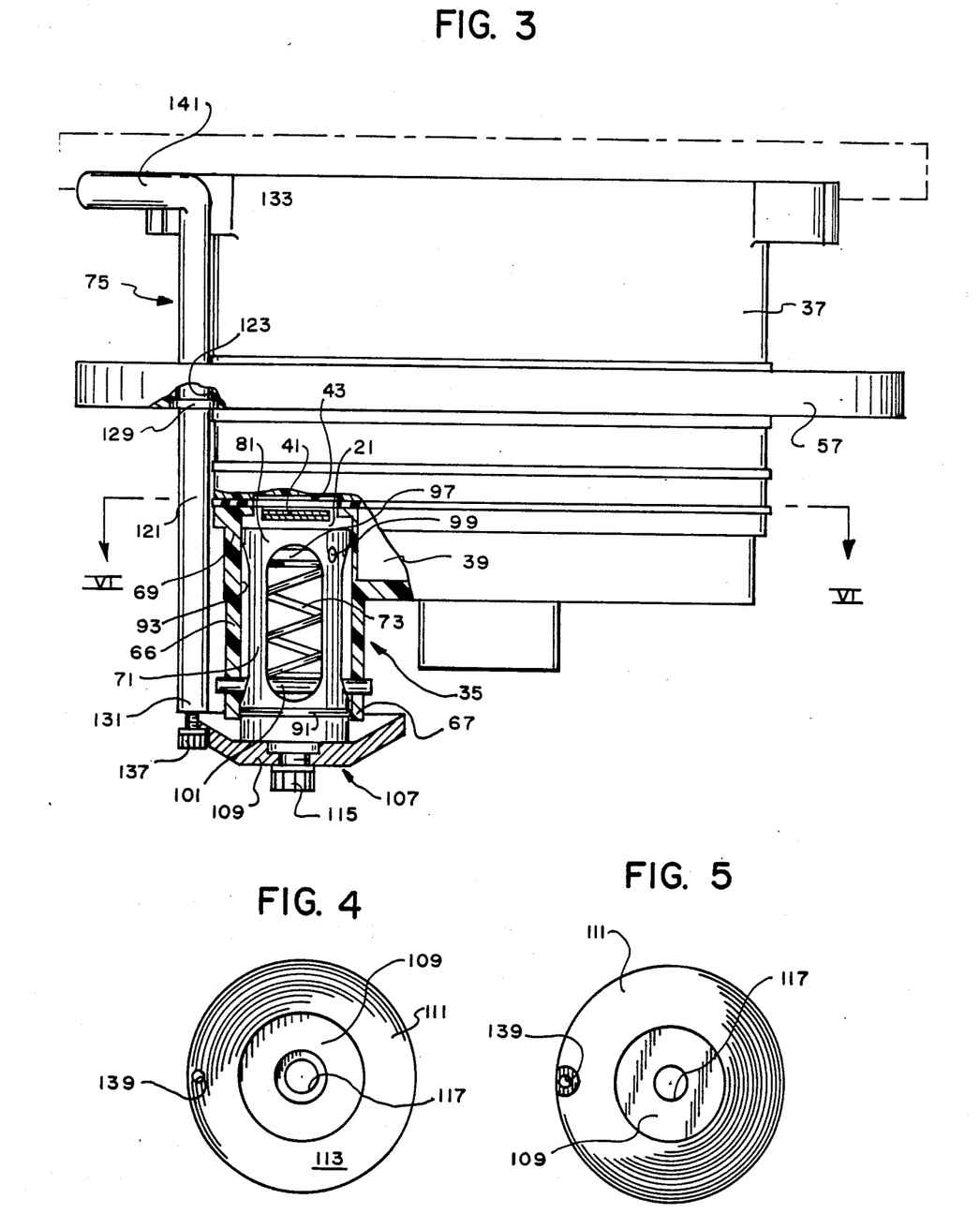
FIG. 3 is a side elevational view of that shown in FIG. 2 with a portion being broken away to show the valve of the present invention in an unrestrained condition.
FIG. 4 is a top plan view of the deflector of the present invention.
FIG. 5 is a bottom view of the deflector.
Figure 6:
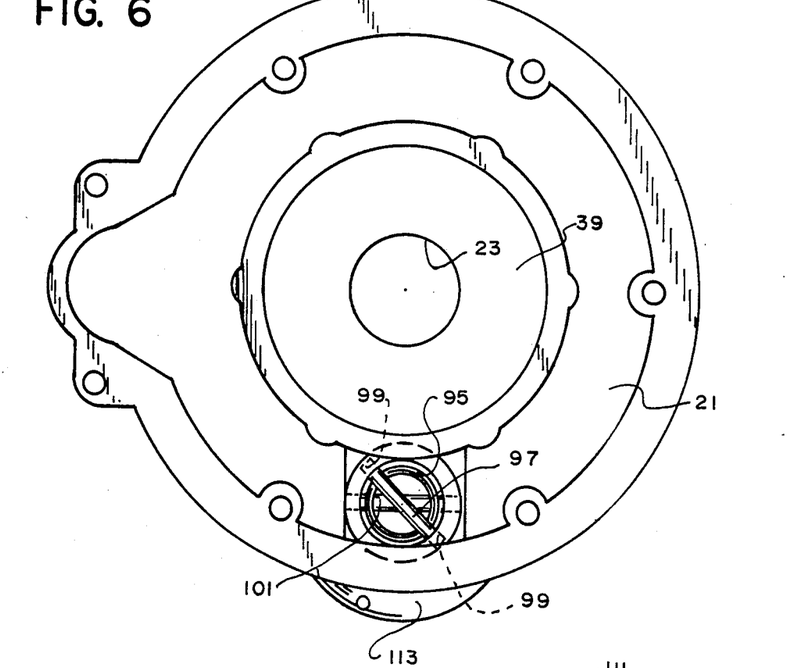
FIG. 6 is a top plan view of a portion of the pumping system of the present invention taken as on the line VI—VI of FIG. 3, and with parts thereof removed for purposes of clarity.
Figure 7:
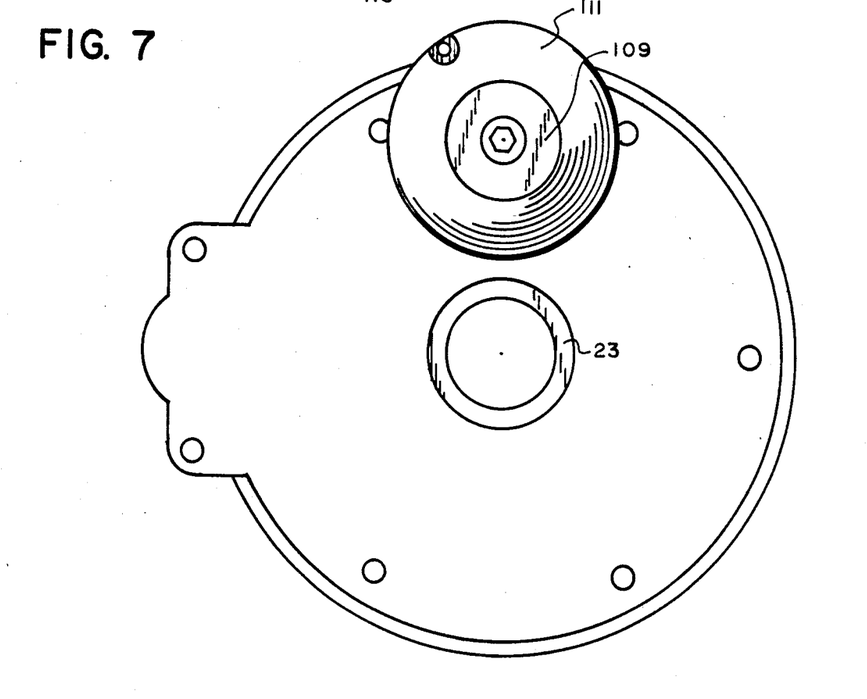
FIG. 7 is a bottom view of that portion of the pumping system shown in FIG. 6.
Figures 8, 9, 10:
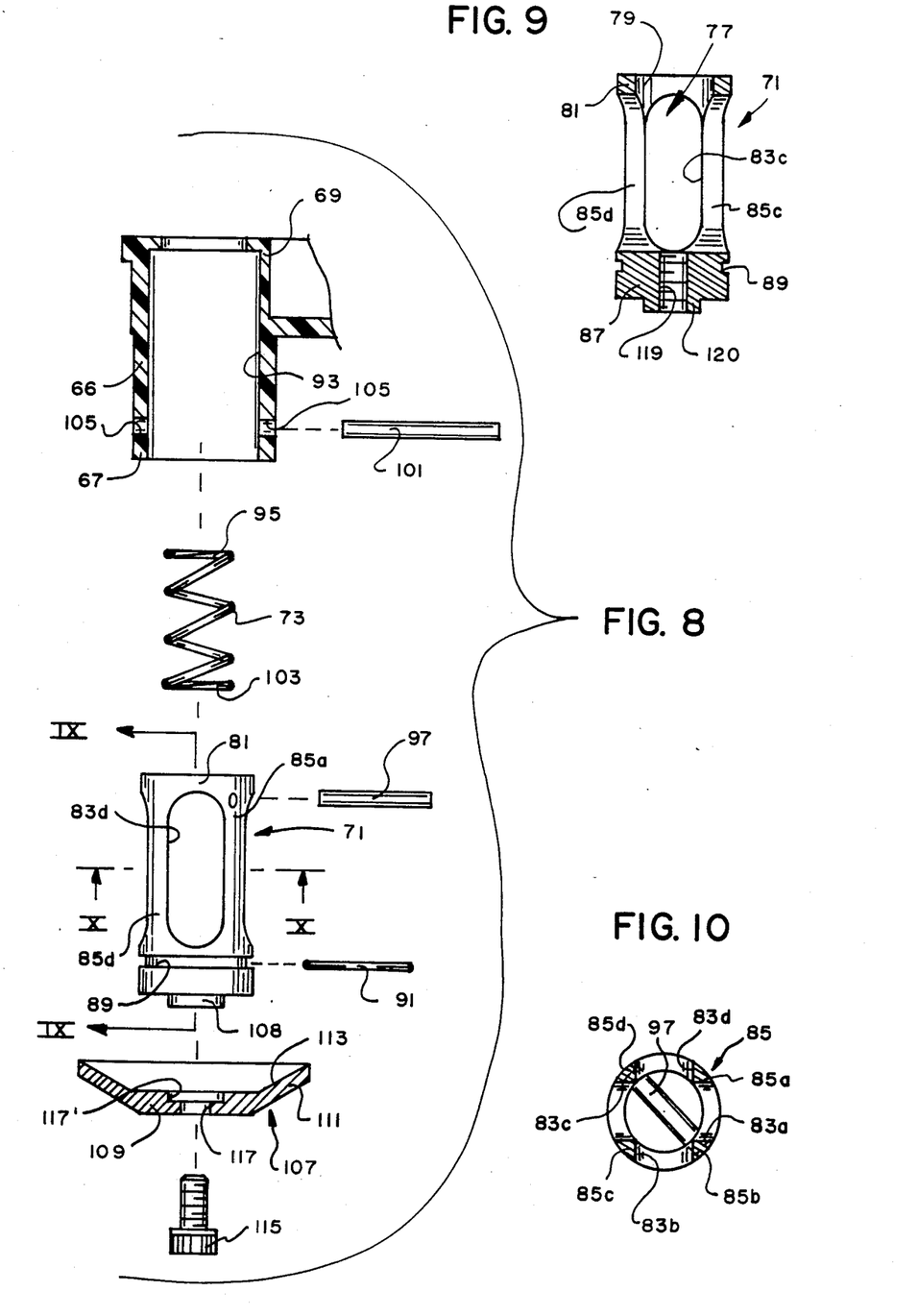
FIG. 8 is an exploded view of the valve of the present invention.
FIG. 9 is a vertical sectional view of the hollow sleeve member of said valve, taken as on the line IX—IX of FIG. 8.
FIG. 10 is a sectional view taken as on the line X—X of FIG. 8.

Valve member 71 is selectively placeable in a free condition in which valve member 71 is relatively unrestrained to move between an upper closed position of valve 35 shown in FIG. 3 and lower opened positions of valve 35 in which the liquid chemical and the like is allowed to flow from outlet chamber 21 through passageway means in valve member 71 which includes opening 79, hollow interior 77 and apertures 83a, 83b, 83c and 83d, into the interior 15 of container 13. Also, valve member 71 is placeable in various restrained conditions of valve 35 as will be better understood in the description of the operation to follow.

Figure 1:
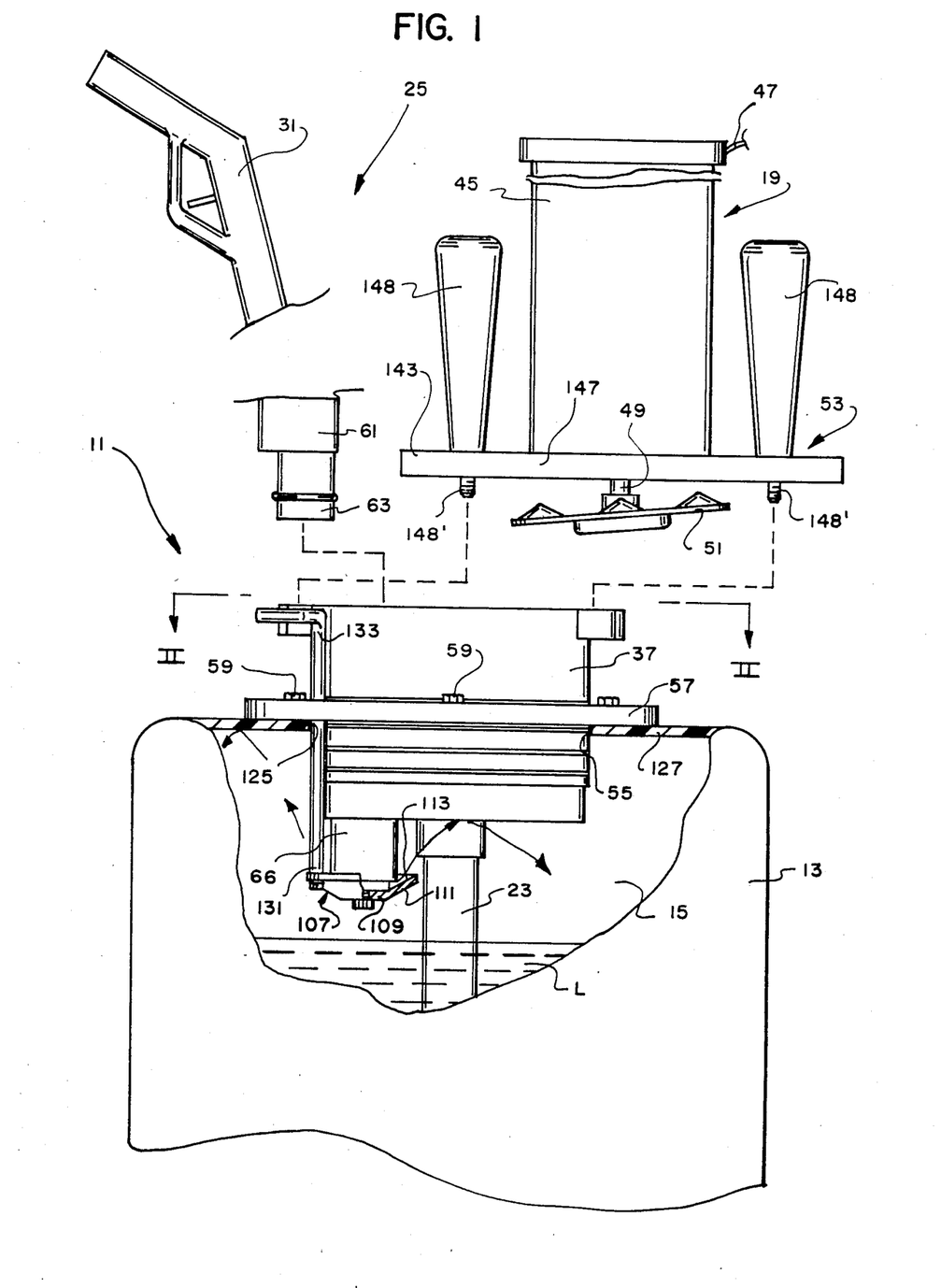
FIG. 1 is an exploded view of the pumping system of the present invention showing portions broken away for purposes of illustration.
Figure 2:
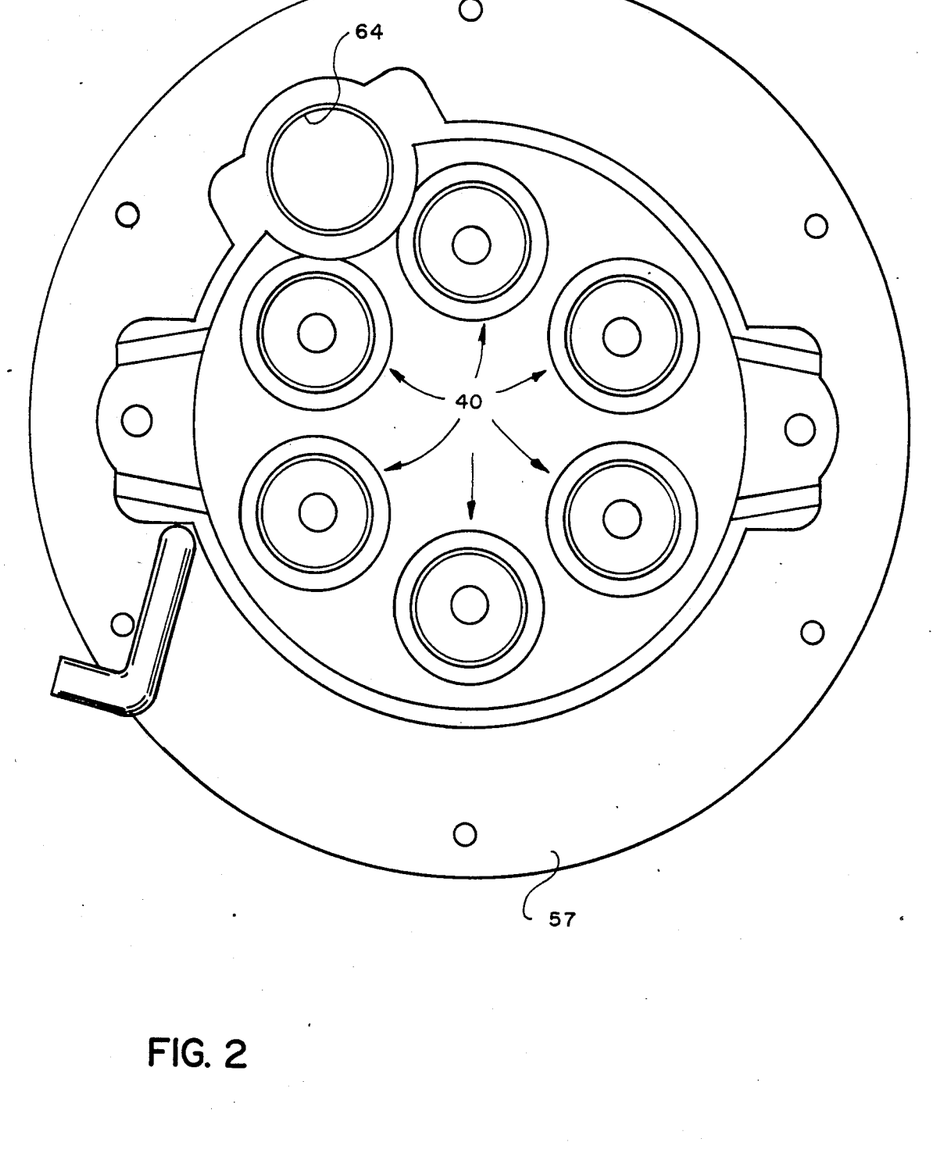
FIG. 2 is an enlarged top view of a portion of the pump means of the pumping system in which the present invention is incorporated, and taken substantially on line II—II of FIG. 1.

When in said relatively unrestrained condition shown in FIGS. 1, 2 and 3, handle 141 is unlatched, that is, it is rotated out from the projection 143 so that rod 121 and valve member 71 are free to move upwardly and downwardly. Said unrestrained position is the normal position when fluid is being pumped from interior 15 and out of nozzle means 31. When in said unrestrained position, normally spring means 73 will urge valve member 71 into said upper closed position of valve 35 as shown in FIG. 3. However, if nozzle means 31 is shut off or for some other reason the pressure outlet chamber 21 exceeds a predetermined pressure, the pressure acting against valve member 71 will cause movement of the valve member 71 downwardly against the pressure of spring means 73 to expose the apertures 83a, 83b, 83c and 83d below the lower end of hollow sleeve member 66 so that the pressure is relieved and the liquid chemical or the like flows outwardly through the apertures 83a, 83b, 83c and 83d into the interior 15 of container 13, as shown in FIG. 1. Thus, the valve 35 acts as a bypass valve to recirculate the chemicals or the like which move from the interior 15 up through intake pipe means 23, into inlet chamber 39, through pump 17 and pump chambers 43, through outlet valve means 41, into outlet chamber 21 and through valve 35 back into the interior 15 from whence it is recirculated again and again through the above mentioned path. As soon as the nozzle means 31 is opened, valve 35 will again close under the influence of spring means 73.

Figure 11:
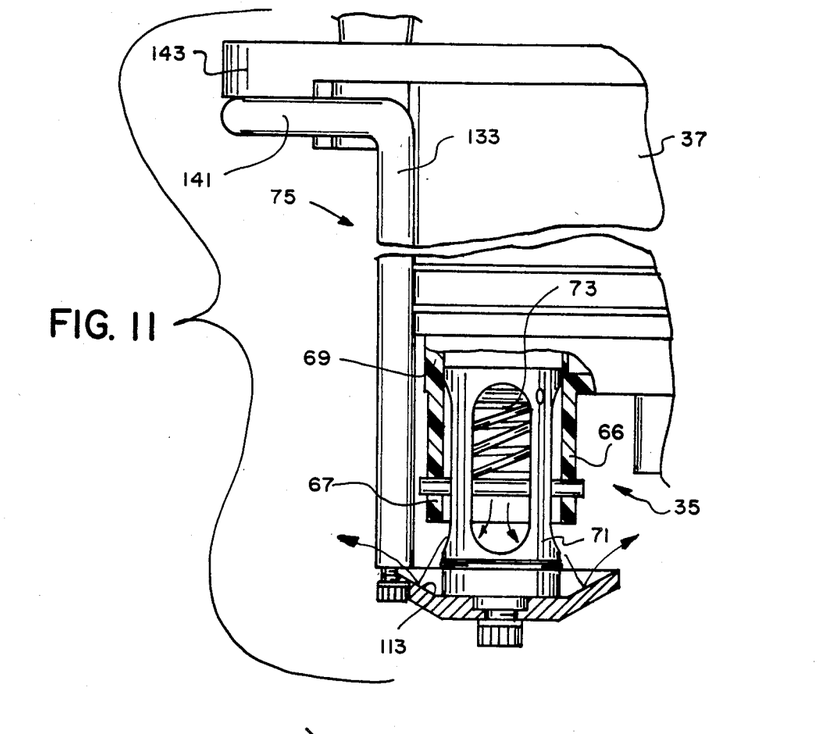
FIG. 11 is a view similar to a portion of FIG. 3 but showing the valve member in a mechanically restrained condition.
Figure 12:
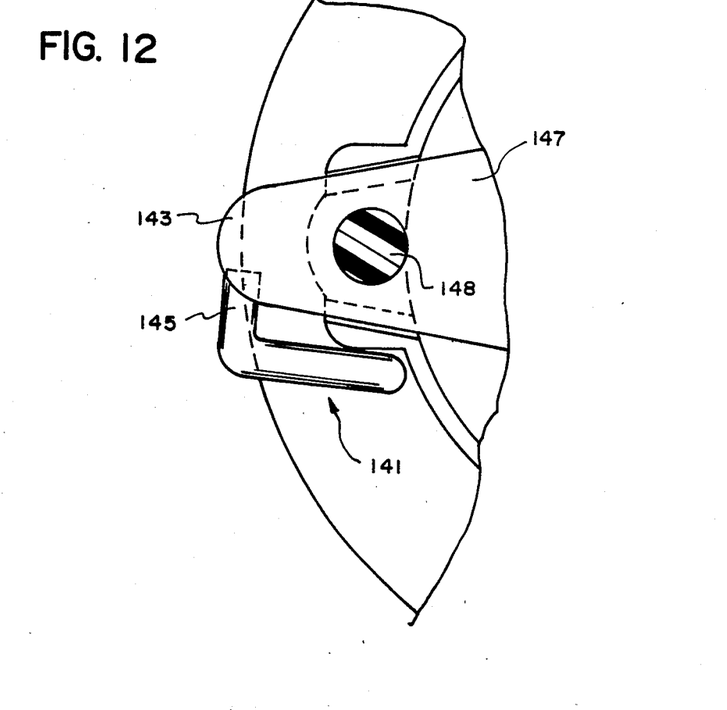
FIG. 12 is a top plan view of that portion of the device shown in FIG. 11.

Valve means 35 may be restrained and placed in several restrained conditions, to be described hereinafter, by manipulation of control means 75. Thus, valve 35 may be placed in a mechanically restrained condition by pushing downwardly on handle 141, rotating handle 141 until it is beneath projection 143 and then releasing the handle 141 so that it is engaged beneath projection 143. It will be understood that the spring means 73 will urge handle 141 up against the underside of projection 143 and keep it in that position which is shown in FIGS. 11 and 12. There is preferably an inturned portion 145 of handle 141 which is the part that preferably engages beneath the projection 143, as best seen in FIG. 12.

The projection 143 may be any suitable part of the pump 17, but is preferably the end of the mounting bar 147 to which the pump driving means 19 is attached and which attaches the pump driving means to the pump body 37, as by means of the handles 148 and threaded studs 148', preferably in a manner shown in my said patent application, U.S. Ser. No. 06/646,916.

When valve 35 is placed in said mechanically restrained condition hereinabove described, portions of apertures 83a, 83b, 83c and 83d will be exposed below the lower end 67 of sleeve member 65 and the liquid flowing downwardly through the apertures 83a, 83b, 83c and 83d will strike the annular face 113 and be deflected upwardly and outwardly as shown in FIGS. 1 and 11. This is particularly useful when rinsing the interior 15 of the container as will be further described hereinafter.

There are in general two other restrained conditions of valve 35, both of which are manual, as follows: First, handle 141 may be manually pushed downwardly to open the valve 35 to an even greater extent than when valve 35 is held in a mechanically restrained condition as heretofore described. Thus, downward manual pressure may be exerted at different degrees and to a completely open downward position shown in FIG. 13. In this last described position, fluid is dumped or recirculated without putting unnecessary strain on the motor. Thus, it will be understood that when the valve 35 is in said mechanically restrained condition and with the nozzle means 31 being closed, the pump 17 is pumping against the spring pressure of spring means 73, which is alright for short periods of time, but for longer periods when it is desired to reduce strain on the motor 45, the control means 75 is pushed downwardly into the position shown in FIG. 13 and the liquid is dumped back into the interior 15 without motor 45 operating against the spring means 73 since spring means 73 is now being held in compression manually.

Another manually restrained condition of valve 35 may be accomplished by swinging handle 141 away from the projection 143 (unless it is already swung into such a position) and pulling upwardly thereon to partially close the valve 35 and cause a higher pressure to be exerted in the system over that which would normally occur when the nozzle means 31 is closed and the liquid is being bypassed through valve 35. This manual restraining of valve 35 by pulling upwardly is particularly useful where there is heavy slurry in the interior 15 and, for example, when a liquid chemical sits overnight, it thickens. Then, the next morning when it is desired to run the pressure higher than normal to move the slurry through the system, the above procedure of pulling upwardly on handle 141 is available.

Figure 13:
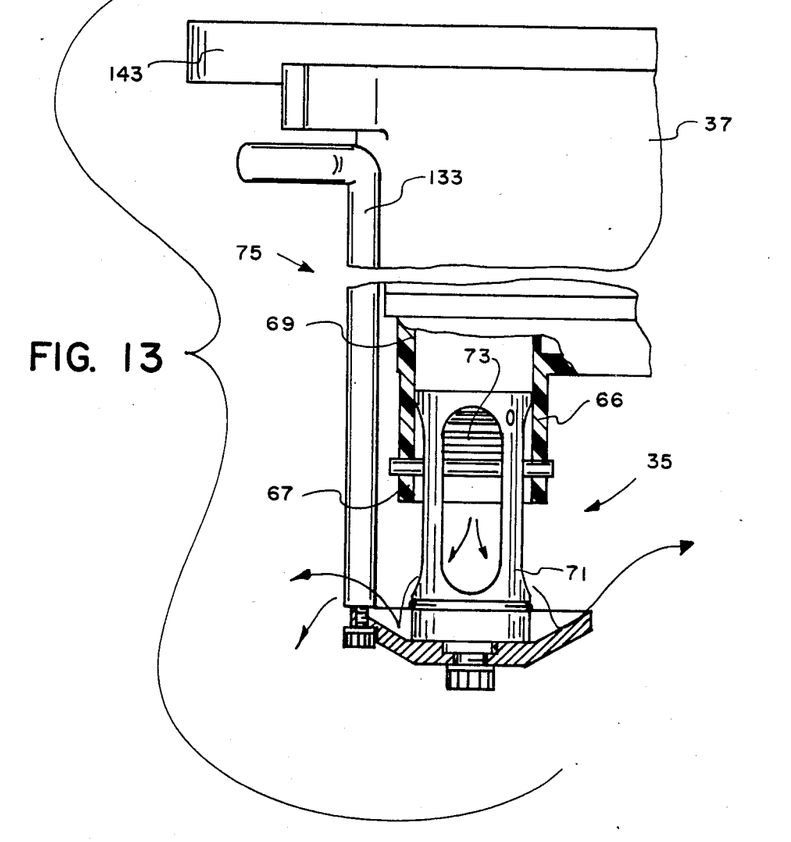
FIG. 13 is a view similar to FIG. 11 but showing the valve member in downward manually restrained condition.
Figure 14:
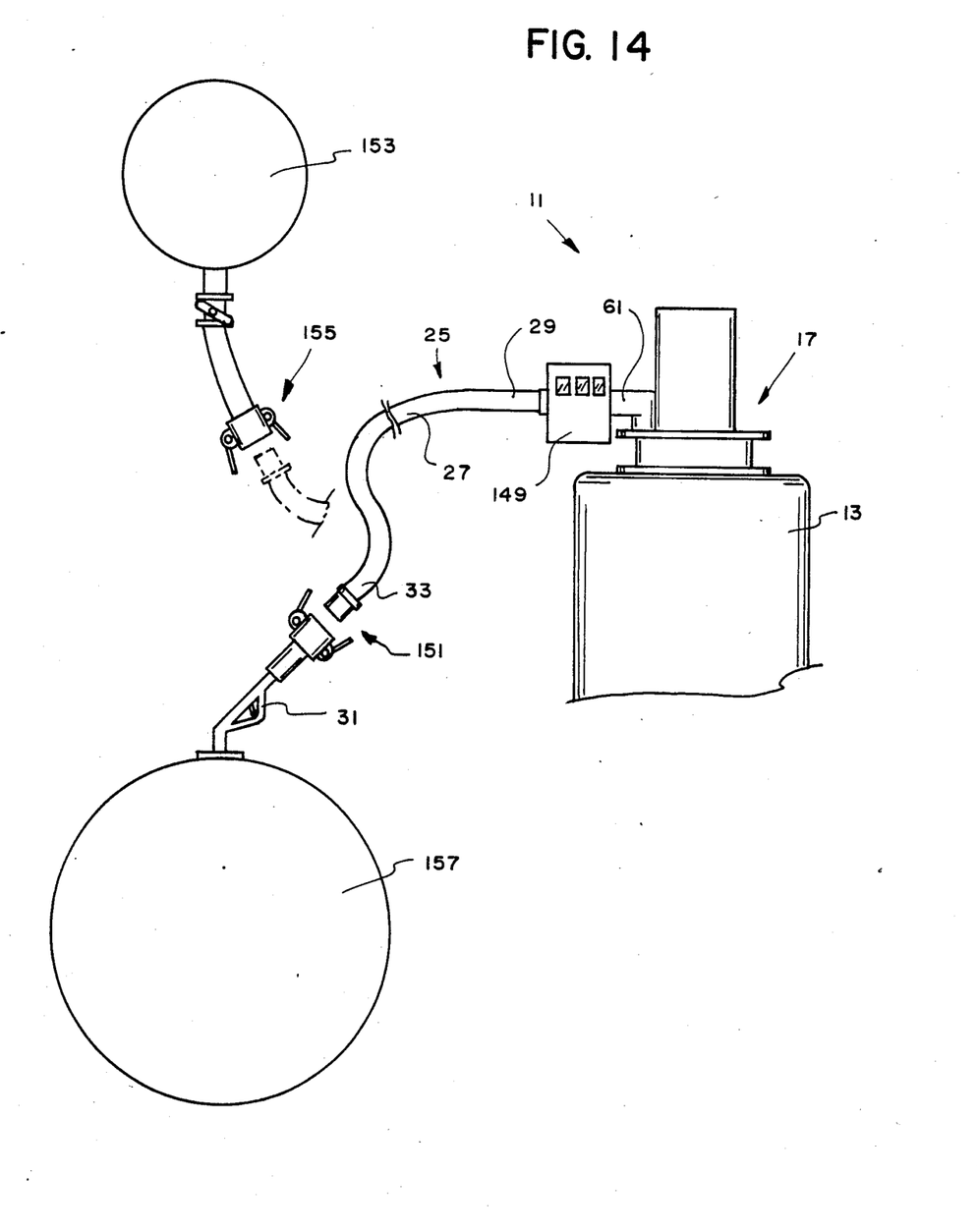
FIG. 14 is a diagrammatic view of the pumping system of the present invention.

Various other functions in addition to those heretofore described can be performed by the system 11 of the present invention. For example, in order to comply with the environmental protection standards, particularly those of California, which require several rinsings of the container 13 with clear water and various other draining procedures, these may be accomplished as follows:

First, in order to drain the hose 27 and meter 149 (which is of a construction well known to those skilled in the art and is preferably interposed between end 29 of hose 27 and coupling means 61), valve 35 is held in the manually restrained downward position shown in FIG. 13 or in said mechanically restrained position shown in FIGS. 11 and 12 and with the nozzle means 31 opened and held upwardly, the liquid chemicals drain back through hose 27, meter 149 and valve 35, which is opened, into the interior 15.

Also, when it is desired to rinse the interior 15 of container 13 with clear water after it has been drained, the nozzle 31, which is preferably provided with a quick disconnect coupling 151 well known to those skilled in the art, is removed and the quick disconnect coupling 151 is coupled to the water tank 153 by quick disconnect coupling 155 well known to those skilled in the art.

Then, with the valve 35 being in the manually restrained downward position, water is drained or pumped from the tank 153 by suitable pump means, not shown, well known to those skilled in the art, to fill the interior 15 of container 13 with the required amount of water. After coupling 155 to the water tank 153 has been disconnected, nozzle means 31 is replaced and closed, control means 75 is placed in said mechanically restrained position or if desired it may be left in said free condition, pump 17 is turned on and the annular face 113 causes the water to be deflected upwardly and around the sides of the interior of container 13. Next, the valve 35 is placed in said unrestrained condition (if not already in such a condition), nozzle 31 is opened and the diluent is pumped into a suitable container, such as container 157. The above procedure may be repeated as many times as necessary.

From the foregoing, it will be understood that the above procedures and others may be practiced in complete safety without the user having to come in contact with the poisonous or dangerous chemicals in the container 13 while at the same time complying with the environmental protectiona agency standards. Stated another way, this is substantially a closed system protecting the user from the dangers of the liquid chemicals yet performing all of the necessary functions to maintain the system and comply with the environmental protection agency laws.

Although the present invention has been described and illustrated with respect to a preferred embodiment thereof and a preferred use therefore, it is not to be so limited since changes and modifications may be made therein which are within the full intended scope of the invention.

I claim:

1. In a pumping system of the type for pumping liquid chemicals and the like including a container having an interior for holding liquid chemicals and the like, positive displacement pump means including an outlet chamber, intake pipe means extending into the interior of said container and communicated with said pump means for providing a conduit for liquid chemicals and the like to be pumped by said pump means from the interior of said container to said outlet chamber, and dispensing means including a hose having one end thereof communicating with said outlet chamber and nozzle means at the other end of said hose; the improvement in said pumping system comprising a valve interposed in said system between said outlet chamber and said interior of said container, said valve including:
   (a) a hollow sleeve member having an upper end and a lower end, said upper end being communicated with said outlet chamber and said lower end communicated with said interior of said container;
   (b) a valve member movably mounted in said sleeve member and being selectively placeable in a free condition in which said valve member is relatively unrestrained between upper closed and lower opened positions of said valve and placeable in restrained opened conditions of said valve;
   (c) spring means urging said valve member towards said upper closed positions; and
   (d) control means fixedly coupled to said valve member for holding said valve member selectively in said restrained opened conditions against the force of said spring means to control the liquid chemicals and the like passing through said hollow body member and to control the fluid pressure in said system.

2. The combination of claim 1 in which said container is closed and in which is included deflecting means coupled to said valve member for deflecting liquid chemicals and the like upwardly against said interior of said container.

3. The combination of claim 1 in which said container is provided with an aperture, and in which said control means includes a rod having an upper end and a lower end, said rod movably extending through said aperture, means for sealing said aperture around said rod, said rod including coupling means at said lower end thereof for coupling said rod to said deflector means and handle means at said upper end of said rod for being manually pulled upwardly to cause movement of said valve member towards closure of said valve for increasing the fluid pressure in said system and for being manually pushed downwardly to cause movement of said valve member towards full opening of said valve.

4. The combination of claim 3 in which is included latching means for holding said control means in a restrained downward position to hold said valve member in a restrained downward position to open said valve and permit free recirculation of the fluid in said interior of said container.

5. In a pumping system of the type for pumping liquid chemicals and the like including a container having an interior for holding liquid chemicals and the like, said container being provided with an aperture, positive displacement pump means including an outlet chamber, intake pipe means for extending into the interior of said container and communicated with said pump means for providing a conduit for liquid chemicals and the like to be pumped by said pump means from the interior of said container to said outlet chamber, and dispensing means including a hose having one end thereof communicating with said outlet chamber and nozzle means at the other end of said hose; the improvement in said pumping system comprising a valve interposed in said system between said outlet chamber and said interior of said container, said valve including:
   (a) a hollow sleeve member having an upper end and a lower end, said upper end being communicated with said outlet chamber and said lower end communicated with said interior of said container;
   (b) a valve member movably mounted in said sleeve member and being selectively placeable in a free condition in which said valve member is relatively unrestrained between upper closed and lower opened positions of said valve and placeable in restrained conditions of said valve;
   (c) spring means urging said valve member towards said upper closed positions;
   (d) control means coupled to said valve member for holding said valve member selectively in said restrained conditions to control the liquid chemicals and the like passing through said hollow body member and to control the fluid pressure in said system, said control means including a rod having an upper end and a lower end, said rod movably extending through said aperture, means for sealing said aperture around said rod, said rod including coupling means at said lower end thereof for coupling said rod to said valve member and handle means at said upper end of said rod for being manually pulled upwardly to cause movement of said valve member towards closure of said valve for increasing the fluid pressure in said system;

(e) deflecting means coupled to said valve member for deflecting liquid chemicals and the like upwardly against said interior of said container; and (f) latching means for holding said control means in a restrained downward position to hold said valve member in a restrained downward position to open said valve and permit free recirculation of the fluid in said interior of said container, said latching means including a projection means projecting outwardly beyond the side of said pump and said rod being rotatable for selectively placing said handle means under said projection means to place said control means in said restrained downward position and for releasing said handle means from said projection means to place said valve member in said free condition.

6. The combination of claim 5 which includes a water tank in said pumping system, quick disconnect means interposed in said dispensing means for disconnecting said nozzle means and attaching said hose to said tank for pumping water form said tank into the interior of said container for the rinsing thereof.

7. The combination of claim 5 in which said deflecting means includes a dish-shaped body having an annular face angled upwardly and outwardly for deflecting liquid chemicals and the like upwardly against the interior of said container.

8. The combination of claim 7 in which said valve member is provided with passageway means communicating said outlet chamber with said interior of said container when said valve member is in said opened positions.

9. The combination of claim 8 in which said valve member is provided with a hollow interior and has upper and lower ends and a body portion interconnecting said upper and lower ends, said valve member including an opening in said upper end thereof communicated with said outlet chamber and said hollow interior of said valve member, said body portion being provided with elongated apertures communicated with said hollow interior of said valve member and communicated with said interior of said container when said valve is in an opened position; said opening in said upper end of said valve member, said hollow interior of said valve member and said elongated apertures establishing said passageway means; and said elongated apertures in said body portion cooperating with said sleeve member as said valve member is moved to vary the size of said elongated apertures exposed below said lower end of said sleeve member to vary the amount of opening of said valve.

10. In combination:

(a) a container having an interior for holding liquid chemicals and the like and having a top provided with an aperture;

(b) positive displacement pump means including an outlet chamber;

(c) intake pipe means extending into the interior of said container and communicating with said pump means for providing a conduit for liquid chemicals and the like to be pumped by said pump means from the interior of said container to said outlet chamber;

(d) a water tank;

(e) dispensing means including a hose having one end thereof communicating with said outlet chamber and nozzle means at the other end of said hose;

(f) quick disconnect means interposed in said dispensing means for disconnecting said nozzle means and for attaching said hose means to said tank for introducing water from said tank into the interior of said container for the rinsing thereof;

(g) a valve interposed between said outlet chamber and said interior of said container, said valve including:

(1) a hollow sleeve member having an upper end and a lower end, said upper end being communicated with said outlet chamber and said lower end communicated with said interior of said container;

(2) a valve member movably mounted in said sleeve member and being selectively placeable in a free condition in which said valve member is unrestrained between upper closed and lower opened positions of said valve and restrained conditions, said valve member including passageway means communicating said outlet chamber with said interior of said container when said valve member is in said opened positions, said valve member being provided with a hollow interior, upper and lower ends and a body portion interconnecting said upper and lower ends, said valve member including an opening in said upper end thereof communicated with said outlet chamber and said hollow interior of said valve member, said body portion being provided with elongated apertures communiated with said hollow interior of said valve member, and communicated with said interior of said container when said valve is in an opened position; said opening in said upper end of said valve member, said hollow interior of said valve member, and said elongaged apertures establishing said passageway means, and said elongated apertures in said body portion cooperating with said sleeve member as said valve member is moved to vary the size of said elongated apertures exposed below said lower end of said sleeve member to vary the amount of opening of said valve;

(3) spring means for urging said valve member towards said upper closed position;

(4) control means coupled to said valve member for holding said valve member selectively in said restrained conditions to control liquid chemicals and the like passing through said hollow body member and to control the fluid pressure, said control means including a rod having an upper end and a lower end, said rod movably extending through said aperture, means for sealing said aperture around said rod, said rod including coupling means at said lower end thereof for coupling said rod to said valve member and handle means at said upper end of said rod for being manually pulled upwardly to cause movement of said valve member towards closure of said valve for increasing the fluid pressure;

(h) latching means for holding said control means in a restrained downward position to hold said valve member in a restrained downward position to open said valve and permit free recirculation of the fluid in said interior of said container; and (i) deflecting means coupled to said valve member for deflecting fluid upwardly against the interior of said container.

* * * * *